(12) United States Patent
Arnold

(10) Patent No.: US 8,074,775 B2
(45) Date of Patent: Dec. 13, 2011

(54) WHEEL IMMOBILIZER APPARATUS AND ASSOCIATED METHOD

(75) Inventor: Paul Arnold, Crestwood, KY (US)

(73) Assignee: United Parcel Service of America, Inc., Atlanta, GA (US)

( * ) Notice: Subject to any disclaimer, the term of this patent is extended or adjusted under 35 U.S.C. 154(b) by 256 days.

(21) Appl. No.: 11/695,433

(22) Filed: Apr. 2, 2007

(65) Prior Publication Data
US 2008/0185238 A1    Aug. 7, 2008

Related U.S. Application Data

(60) Provisional application No. 60/888,452, filed on Feb. 6, 2007.

(51) Int. Cl.
*B60T 3/00* (2006.01)

(52) U.S. Cl. ......................................................... 188/32

(58) Field of Classification Search ............... 188/32; D12/217
See application file for complete search history.

(56) References Cited

U.S. PATENT DOCUMENTS

| | | | |
|---|---|---|---|
| 1,174,410 A | 3/1916 | Hajasok et al. | |
| 2,697,494 A * | 12/1954 | Parks ............................ | 188/32 |
| 3,687,238 A | 8/1972 | Carpenter | |
| 3,845,643 A * | 11/1974 | Barrett .............................. | 70/18 |
| 4,833,442 A | 5/1989 | Von Heck | |
| 5,427,210 A | 6/1995 | Willaford | |
| D387,323 S * | 12/1997 | Wilcox ........................ | D12/217 |
| 5,832,759 A | 11/1998 | Yamabe | |
| 6,425,465 B1 * | 7/2002 | Tallman et al. .................. | 188/32 |
| 6,467,586 B2 * | 10/2002 | Agtuca ............................ | 188/32 |
| D489,310 S * | 5/2004 | Olson et al. .................... | D12/217 |
| 6,896,223 B2 | 5/2005 | Fulcher et al. | |
| 6,948,593 B2 | 9/2005 | Horton | |
| 7,121,508 B2 | 10/2006 | Fulcher et al. | |
| 2004/0045774 A1 | 3/2004 | D'Alessio | |

FOREIGN PATENT DOCUMENTS

GB    2 128 949 A    5/1984

OTHER PUBLICATIONS

The International Search Report and Written Opinion for International Application No. PCT/US2008/052874, completed Jun. 11, 2008, mailed Jun. 23, 2008.

* cited by examiner

*Primary Examiner* — Bradley King
(74) *Attorney, Agent, or Firm* — Alston & Bird LLP

(57) ABSTRACT

Embodiments of the present invention provide a wheel immobilizer apparatus and method for immobilizing a wheel of a vehicle. For example, a wheel immobilizer apparatus may include a plurality of chocks and an adjustment member secured to each of the chocks and configured to adjust a relative distance between a pair of the plurality of chocks. The apparatus may also include a flexible member comprising a pair of free ends each secured to a respective one of the pair of chocks and configured to secure the chocks to a wheel.

16 Claims, 7 Drawing Sheets

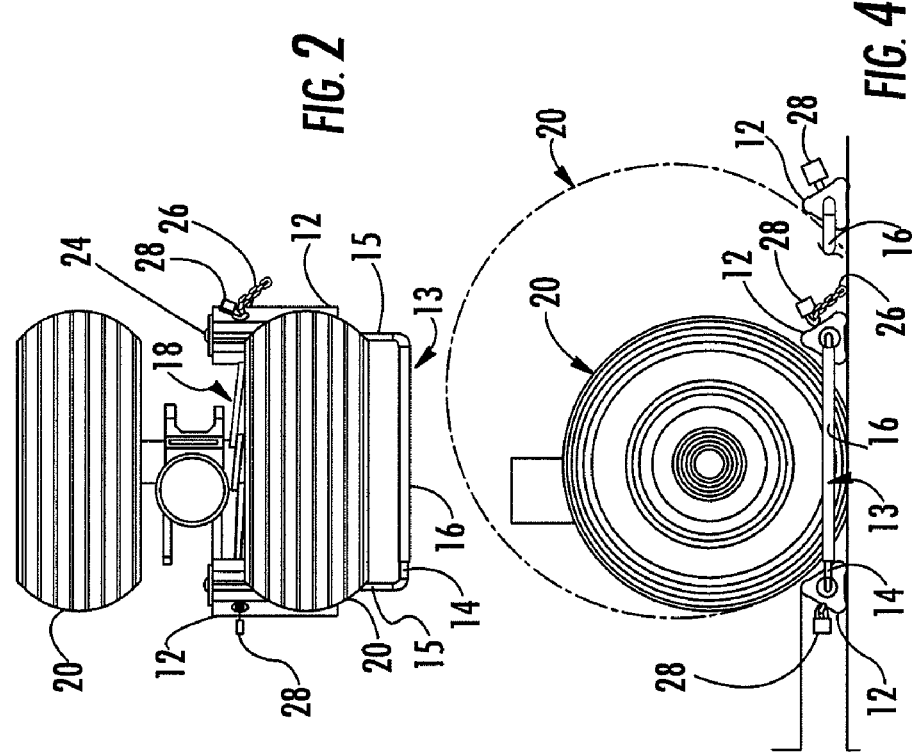
FIG. 2
FIG. 4
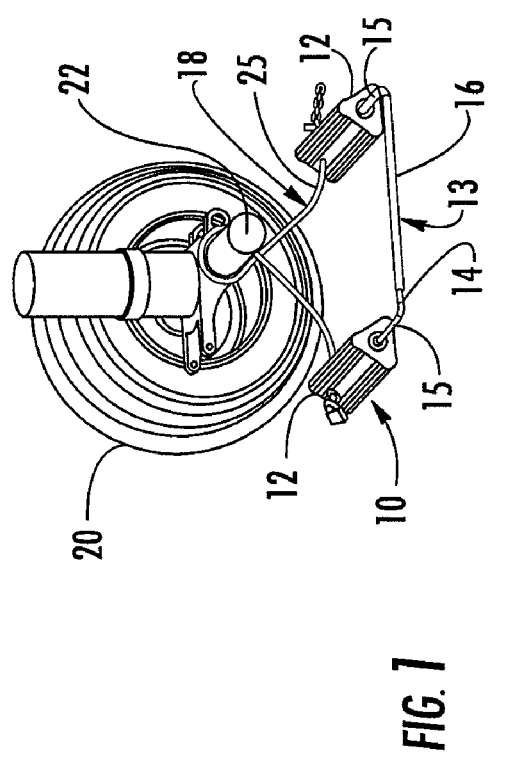
FIG. 1
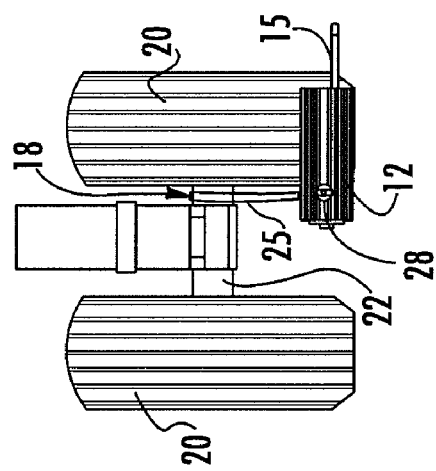
FIG. 3

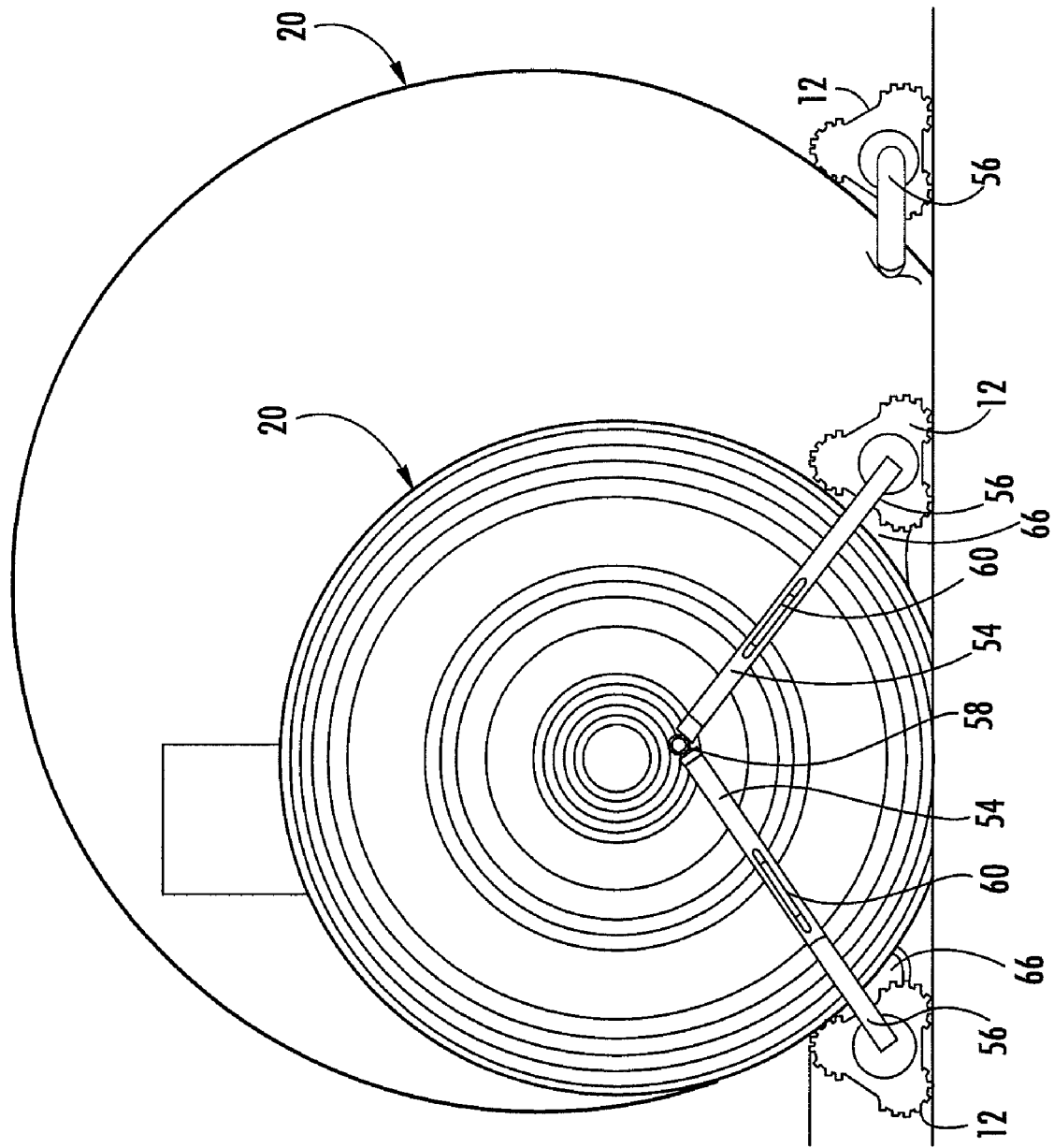

WHEEL IMMOBILIZER APPARATUS AND ASSOCIATED METHOD

CROSS-REFERENCE TO RELATED APPLICATIONS

This application claims priority of U.S. Patent Application No. 60/888,452 filed on Feb. 6, 2007, which is hereby incorporated herein in its entirety by reference.

BACKGROUND OF THE INVENTION

1. Field of the Invention

Embodiments of the present invention relate to wheel immobilizers and, more particularly, to a wheel immobilizer apparatus for immobilizing and securing a vehicle in a stationary position.

2. Description of Related Art

Wheel chocks may be employed for immobilizing a vehicle to ensure that the vehicle will remain in a stationary position. For example, wheel chocks may be used to immobilize aircraft, trucks, or other large vehicles. Traditionally, wheel chocks include a pair of wedge-shaped members that are positioned on opposite sides of a vehicle's wheel. However, such wedge-shaped members do not provide adequate safeguards to prevent unwanted movement of the vehicle due to sudden wind gusts or other sudden forces applied to or on the vehicle.

Furthermore, wheel chocks or immobilizers may be employed for security purposes. Thus, the wheel chock may include a locking mechanism to prevent theft of the vehicle. For example, U.S. Pat. No. 5,427,210 to Willaford discloses a wheel chock that includes a pair of U-shaped channel members that each has locking holes defined in a side panel. The locking holes are configured to receive a lock, while a chain is secured at one end to the lock, extends over the wheel, and attaches at its opposite end to one of the U-shaped channel members.

Despite these improvements, there is a need for a wheel immobilizer that is capable of adequately immobilizing a vehicle in a stationary position. Moreover, there is a need for a wheel immobilizer that is capable of being adjusted to varying wheel sizes and being secured in position. In addition, there is a need for a wheel immobilizer that is user friendly and that is capable of being readily secured to a vehicle's wheel.

BRIEF SUMMARY OF THE INVENTION

In general, exemplary embodiments of the present invention may provide improvements over the prior art by, among other things, providing an apparatus and a method for immobilizing a wheel. In particular, embodiments of the present invention may provide an apparatus that includes wheel chocks, an adjustment member, and a flexible member used to secure and immobilize a wheel.

According to one embodiment of the present invention, a wheel immobilizer apparatus for immobilizing a wheel of a vehicle is provided. The apparatus include a plurality of chocks each configured to be positioned adjacent to a wheel. The apparatus also includes an adjustment member secured to a pair of the chocks and configured to adjust a relative distance therebetween. In addition, the apparatus includes a flexible member including a pair of free ends each secured to a respective one of the pair of chocks and configured to secure the pair of chocks so as to immobilize the wheel.

According to various aspects of the apparatus, the adjustment member includes a pair of pivotably interconnected arms, wherein each arm is attached to a respective one of the pair of chocks. The angle defined between the pair of arms may be adjusted to correspondingly adjust a distance between the pair of chocks. Each of the arms may include a handle and/or a pivoting end having a cutout for receiving a portion of the other pivoting end. The flexible member may include a chain disposed within a hose member. Furthermore, the apparatus may include a pair of retaining plates, wherein each retaining plate is attached to a respective one of the chocks. Each of the retaining plates may include a hole for receiving the free ends of the flexible member and/or be attached to the chocks at an opposite end as that of the adjustment member. One end of the flexible member may be attached to one of the pair of retaining plates, while the opposite end of the flexible member may be adjustably attached to the other of the pair of retaining plates.

An additional aspect of the present invention provides a method for immobilizing a wheel of a vehicle. The method includes positioning a pair of chocks on opposite sides of a wheel and adjusting a relative distance between the pair of chocks such that the chocks are positioned adjacent to the wheel. In addition, the method includes securing a flexible member to an axle of the wheel and securing the flexible member to the pair of chocks.

Aspects of the method include tensioning the flexible member prior to securing the flexible member to the pair of chocks. The flexible member may be secured by wrapping the flexible member about the axle at least one revolution and/or attaching at least one free end of the flexible member to a respective one of the pair of chocks. The distance between the chocks may be adjusted by pivoting a pair of interconnected arms with respect to one another.

A further aspect of the present invention provides a wheel immobilizer apparatus for immobilizing a wheel of a vehicle. The apparatus includes a plurality of chocks that are each configured to be positioned adjacent to a wheel and that each include a first end and a second end. The apparatus also includes an adjustment member secured to each of the first ends of a pair of chocks and configured to adjust a relative distance between the pair of chocks. Moreover, the apparatus includes a flexible member attached proximate to the second ends of each of the chocks and configured to wrap about a wheel axle at least one revolution so as to immobilize the wheel.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a partial perspective view of a wheel chock apparatus for immobilizing a wheel according to one embodiment of the present invention;

FIG. 2 is a plan view of the wheel chock apparatus of FIG. 1 secured to a wheel according to one embodiment of the present invention;

FIG. 3 is a front elevation view of the wheel chock apparatus shown in FIG. 1 secured to a wheel;

FIG. 4 is a side elevation view of the wheel chock apparatus shown in FIG. 1 secured to a wheel;

FIG. 9 is a side elevation view of the wheel chock apparatus shown in FIG. 5 secured to a wheel.

DETAILED DESCRIPTION OF THE INVENTION

Figure 5:
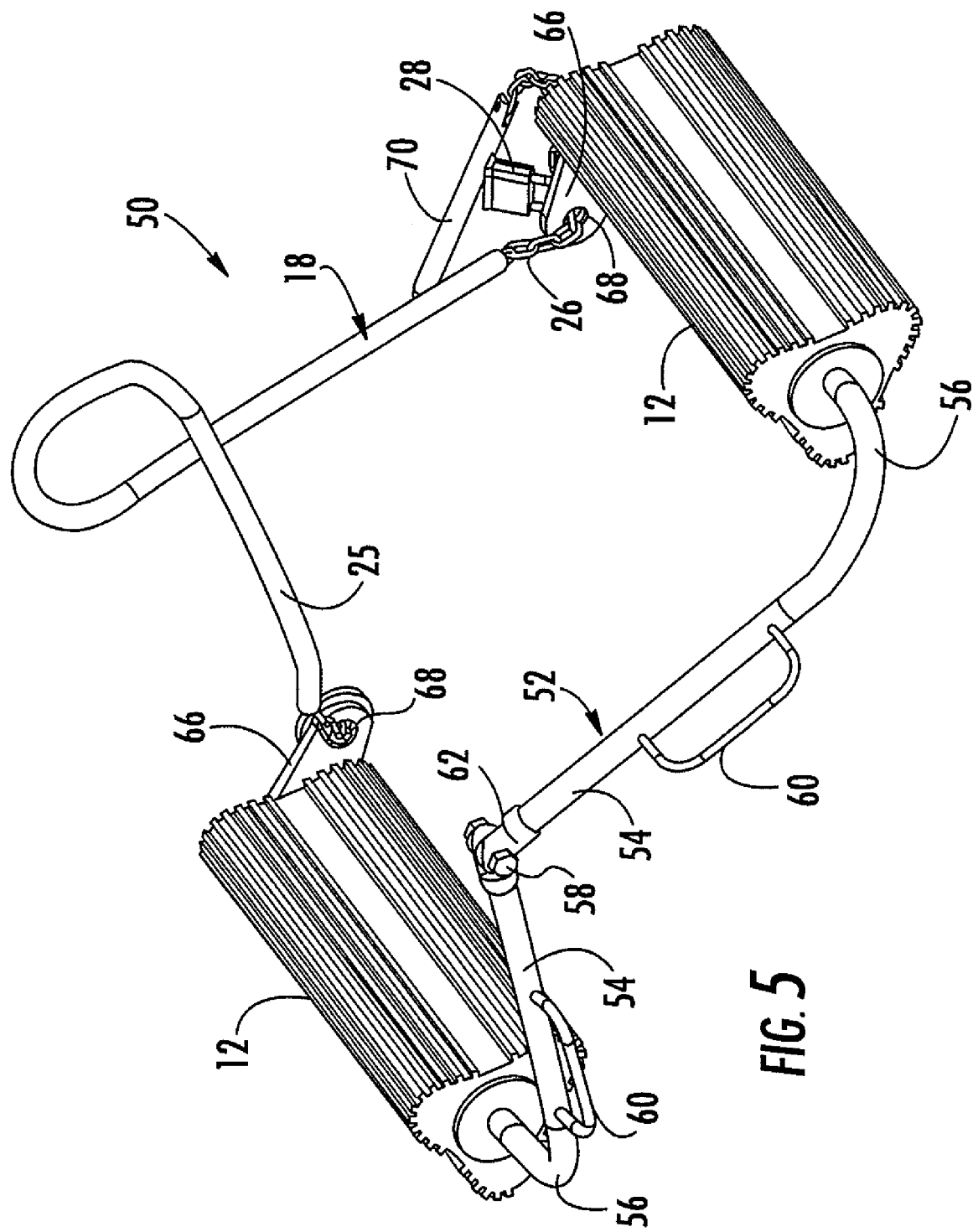
FIG. 5 is a perspective view of a wheel chock apparatus for immobilizing a wheel according to another embodiment of the present invention.
Figure 6:
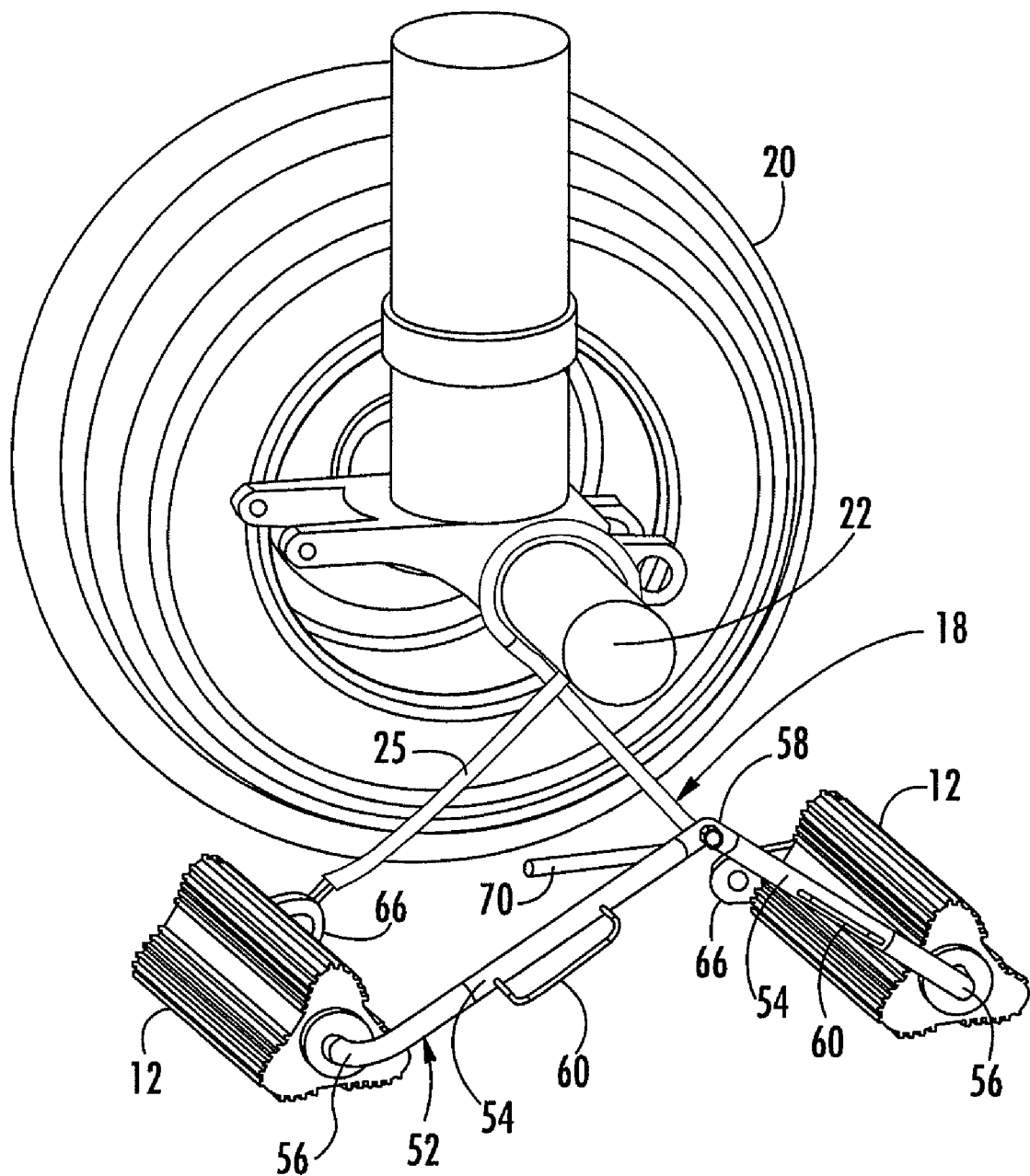
FIG. 6 is a partial perspective view of the wheel chock apparatus of FIG. 5 secured to a wheel according to one embodiment of the present invention.

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, there is shown a wheel immobilizer apparatus 10 according to one embodiment of the present invention. The apparatus 10 generally includes a pair of wheel chocks 12 that are each interconnected with an adjustment member 13 at one end and a flexible member 18 at an opposite end thereof. The apparatus 10 is configured to immobilize and secure a wheel 20 of a vehicle in a stationary position.

It is understood that although reference is made herein to employing the wheel immobilizer apparatus 10 with an aircraft, such as a 727 or 747, the apparatus is capable of being used with any number of vehicles that include one or more wheels. Thus, the apparatus 10 could be used to immobilize aircraft, trucks, automobiles, mobile support equipment, and the like.

FIG. 1 illustrates that the wheel immobilizer apparatus 10 includes a pair of chocks 12. The chocks 12 may be conventional chocks as known to those of ordinary skill in the art. Each chock 12 is generally triangular in cross section such that at least one surface is configured to be positioned adjacent to a wheel 20, while another surface is configured to rest on a rolling surface. Each chock 12 typically includes a high-friction material, such as rubber, on its outer surface to resist sliding. In addition, each chock 12 may include ribs extending along the length of the chock, as shown in FIG. 1, which also resists sliding when a force applied from the wheel 20 is exerted thereon.

It is understood that the chocks 12 shown in FIGS. 1-4 are not meant to be limiting, as the chocks may be various sizes and configurations in additional aspects of the present invention. For example, the chocks 12 may have different cross sections, such as U-shaped, comprise different materials, and have various outer surface characteristics to resist sliding. In addition, the chocks 12 may be various sizes depending on the size of the wheel and vehicle desired to be immobilized. For instance, each chock 12 may have a length of about 6 inches and be about 6 inches between the base and apex of the chock.

The chocks 12 are interconnected with an adjustment member 13. The adjustment member includes a rod member 14 and a pipe member 16. The rod member 14 is configured to slide within the pipe member 16 such that the pipe member includes a longitudinal channel for accommodating the rod member. For example, the rod member 14 may have a diameter of about 0.75 inches, while the pipe member may have a diameter of about 1.0 inch. The rod member 14 and pipe member 16 may be various materials, such as steel, that are capable of engaging and supporting the chocks 12, as well as facilitating sliding therebetween. The rod member 14 and pipe member 16 are substantially the same length such that the chocks 12 are closest together when the rod member is substantially within the pipe member. Thus, the rod member 14 may slide outwardly from the pipe member 16 to increase the relative distance between the chocks 12. According to one aspect of the present invention, the adjustment member 13 allows for about 15 inches of longitudinal adjustment between the chocks 12, which corresponds to the difference in diameter between a 727 nose wheel (i.e., about 32 inches in diameter) and a 747 nose wheel (i.e., about 49 inches in diameter). FIG. 4 depicts a 727 nose wheel in solid lines, while the 747 nose wheel is shown in phantom lines.

In addition, the rod member 14 and pipe member 16 each includes a connection member 15 that attaches to respective chocks 12. In particular, each chock 12 includes a hole for accommodating ends of the connection members 15, and each connection member is secured at its end with a suitable attachment device 24, such as a bolt and washer. Thus, as depicted in FIG. 2, the rod member 14 and pipe member 16 include a longitudinal sliding portion that is generally perpendicular to the connection members 15, wherein a radius may extend between the rod member and pipe member and respective connection members.

The adjustment member 13 may include various sizes and configurations in additional aspects of the present invention. For example, the rod member 14 and pipe member 16 may be various cross sections, such as circular or rectangular. Furthermore, the connection members 15 may be secured to respective chocks 12 using various techniques such as a press fit, welding, fasteners, or the like. In addition, the adjustment member 13 may be various sizes to allow for any desired amount of adjustment for accommodating a particular wheel 20.

A flexible member 18 is attached to each of the chocks 12. In particular, each end of the flexible member 18 is attached proximate to an opposite end of the chocks 12 as that of the adjustment member 13. A hole is defined in a pair of surfaces of each of the chocks 12 such that each end of the flexible member 18 may be positioned within and slide through respective holes. The flexible member 18 may include a hose 25 that overlies a chain 26. The hose 25 is typically a flexible and non-abrasive material that will not chafe or scratch the axle 22 or other vehicle components. The chain 26 is of a sufficient length to attach at one end via a lock 28 to one chock 12 and attach at its opposite end to another chock 12 via a second lock. Moreover, the hose 25 and chain 26 are of sufficient length and flexibility to be wrapped about the axle 22 one or more revolutions. The chain 26 may also be tensioned while the hose 25 and chain are wrapped about the axle 22 to secure the chocks 12 and adjustment member 13 in position. Once a desired tension of the chain 26 is achieved, the chain may be secured in position with a lock 28.

The flexible member 18 may be various sizes and configurations according to additional aspects of the present invention. According to one embodiment of the present invention, the hose 25 is about 5/16 of an inch in diameter, while the chain 26 is about 1/4 of an inch in diameter and has a break strength of at least 5,000 lbs. The hose 25 and chain 26 may be various lengths, although the chain is typically longer than the hose in order to allow for attachment with the locks 28, and the hose is typically of sufficient length to extend along the chain between each chock 12. It is understood that the hose 25 may be various materials, such as a polymeric material, while the chain 26 could also be any suitable material capable of urging the chocks 12 together and supporting the chocks in position, as well as resisting breaking when force is applied by the wheel 20. Furthermore, the flexible member 18 may be attached at various locations along the length of the chocks 12, but is typically attached proximate to an opposite end of the adjustment member 13 so that the flexible member may be wrapped about the axle 22.

In use, the wheel immobilizer apparatus 10 is secured to a wheel 20, as shown in FIG. 2. There could also be a second wheel immobilizer apparatus 10 positioned on the second wheel 20 shown in FIG. 2, such that there is typically at least one apparatus employed. The wheels 20 generally correspond to the front landing gear of the vehicle, although the apparatus could be employed at various wheel locations on the vehicle. Once positioned on opposite sides of the wheel 20, the distance between the chocks 12 may be adjusted with the adjustment member 13 depending on the diameter of the wheel 20. As also depicted in FIGS. 2 and 3, the chocks 12 are typically not positioned along the centerline of the width of the wheel, as known to those of ordinary skill in the art. Once the chocks 12 are positioned adjacent to, and on opposite sides of, the wheel 20, one end of the flexible member 18 that is initially not secured to the chock is wrapped about the circumference of the axle 22 at least one revolution. The end of the flexible member 18 is then positioned within the hole of the chock, tensioned to a desired tension, and then secured with a lock 28. Thus, once each end of the flexible member 18 is tensioned and secured to respective chocks 12, the wheel 20 is immobilized such that rolling or turning of the wheel is substantially restricted. In addition, the wheel immobilizer apparatus 10 may not be removed from the wheel 20 without breaking the adjustment member 13 or flexible member 18 or without significant disassembly.

FIGS. 5-9 illustrate an additional embodiment of the present invention. As before, the wheel immobilizer apparatus 50 includes a pair of wheel chocks 12 interconnected with a flexible member 18 and an adjustment member 52. Similar to the embodiment described above, the apparatus 50 is configured to immobilize and secure a wheel 20 of a vehicle in a stationary position.

Figure 7:
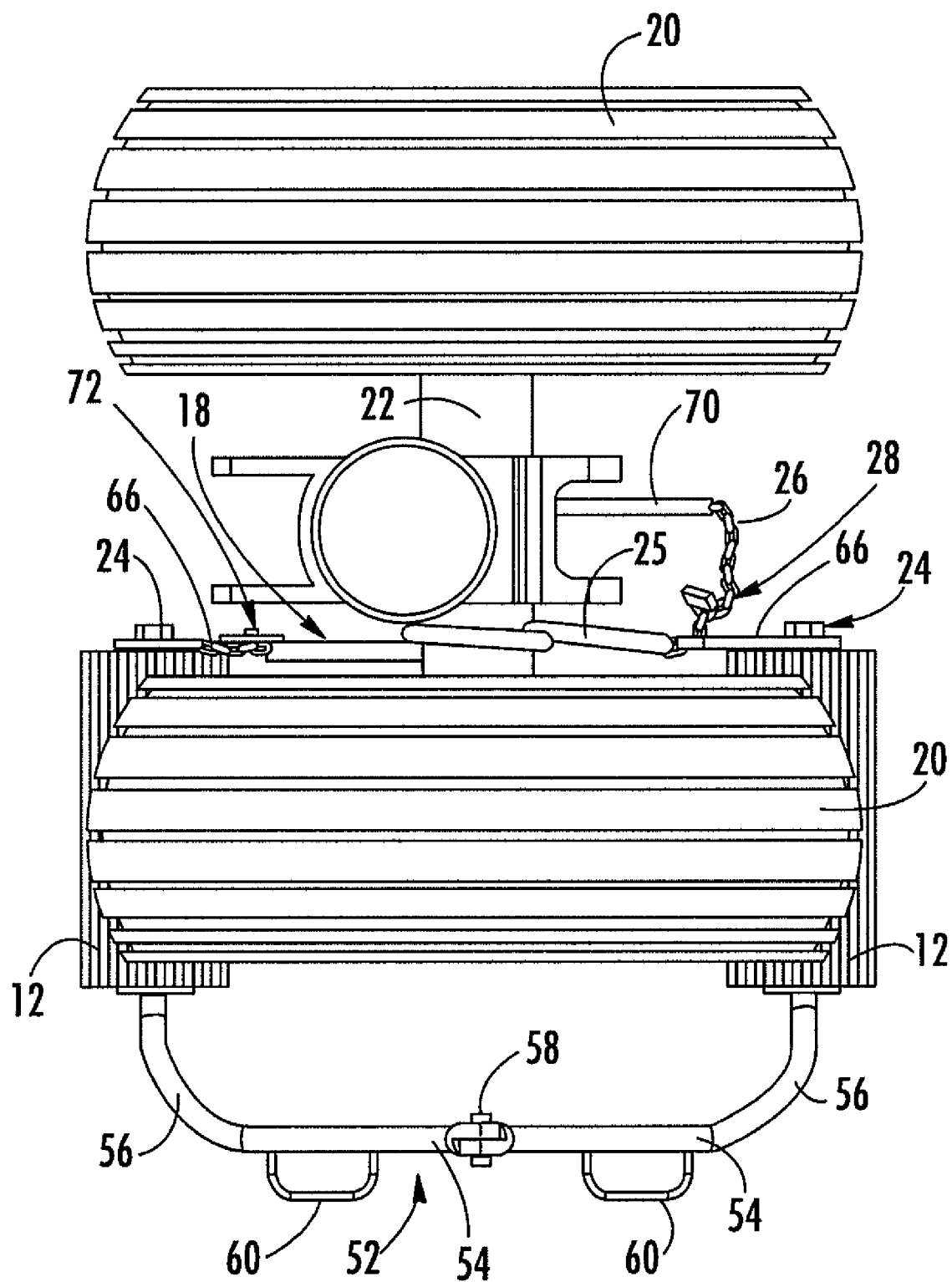
FIG. 7 is a plan view of the wheel chock apparatus of FIG. 5 secured to a wheel according to an embodiment of the present invention.

The adjustment member 52 includes a pair of arms 54 pivotably attached to one another so that the distance between the wheel chocks 12 may be adjusted by pivoting the arms relative to one another. For example, the angle defined between the arms 54 may be any desired angle, such as between 0 and 180 degrees to accommodate various wheel 20 sizes. The arms 54 may be attached with any suitable mechanism that allows each of the arms to pivot with respect to one another, such as with a bolt 58. Each arm 54 includes a curved portion 56 that interconnects with a respective wheel chock 12. Each of the arms 54 may extend within and along the length of a respective wheel chock 12 and be secured to the wheel chock with an attachment device 24 at its end, as shown in FIG. 7. Or, the arms 54 may be attached at any other desired location to or within the wheel chocks 12 using any suitable technique for securing the adjustment member 52 to the wheel chocks.

FIGS. 10A-10D illustrate enlarged views of the pivoting ends 62 of the arms 54. As shown, the pivoting ends 62 are interconnected to allow pivoting movement relative to one another. In this regard, each of the pivoting ends 62 includes a cutout 64 that facilitates the interconnection of the arms 54 as well as pivoting movement therebetween. The cutouts 64 are of sufficient depth and length to receive the bolt 58 or a similar interconnection device. The cutouts 64 allow the pivoting ends 62 to be positioned adjacent to one another, as well as allow the longitudinal axes of the arms to be aligned in a substantially coplanar relationship. In order to facilitate pivoting between the arms 54 to define an obtuse or a large angle (e.g., about 180 degrees) therebetween, the rounded ends of the pivoting ends 62 could be chamfered (e.g., at a 45 degree angle) to prevent impingement between the pivoting ends during rotation. The pivoting ends 62 could be separately attached to respective arms 54, such as via welding, or the pivoting ends could be integrally formed on the ends of the arms.

In addition, each arm 54 includes a handle 60 that enables a user to manipulate the adjustment member 52, as well as transport the wheel immobilizer apparatus 50. Depending on the size of the wheel 20 to be immobilized, a user may use the handles 60 to adjust the angle between the arms 54 and, thus, adjust the distance between the wheel chocks 12.

Attached adjacent to the wheel chocks 12 and opposite the end of the adjustment member 52 are retaining plates 66. Thus, unlike the wheel chocks 12 described above with respect to the wheel apparatus 10 of FIGS. 1-4 that includes holes defined in the wheel chocks for receiving a chain 26, the wheel chocks of this particular embodiment do not include holes, as the chain is secured to the wheel chocks with retaining plates 66. The retaining plates 66 are attached to respective wheel chocks 12 with an attachment device 24, such as a fastener, as shown in FIG. 7. Thus, the attachment device 24 could secure both the retaining plate 66 and the adjustment member 52 to the wheel chocks 12. Each retaining plate includes a hole 68 at its free end for receiving the chain 26 therethrough. At one end of the flexible member 18, the chain 26 is attached to the retaining plate 66, such as with welding, fasteners, or any other suitable technique. According to one exemplary embodiment, the end of the chain 26 is welded to a washer 72 as shown in FIG. 7. The opposite end of the flexible member 18 includes a guide pin 70 attached to the chain 26. The guide pin 70 is employed to help guide the end of the chain 26 through the hole 68. The chain 26 may be pulled through the hole to adjust the tension on the chain when secured about the axle 22. The user could also use the guide pin 70 to pull and tension the chain 26. In addition, a lock 28 may be employed to prevent the chain 26 from being pulled through the hole 68 and thereby secures the end of the chain to the wheel chock 12 at the desired length and tension.

It is understood that the illustrations shown in FIGS. 5-10 are not meant to be limiting. In this regard, the adjustment member 52 may be various sizes and configurations. For example, the arms 54 may be various lengths, cross sections, and sizes depending on the size of the wheel 20 to be immobilized. Thus, the adjustment member 52 could be circular, rectangular, or any other cross section, and may include curved portions 56 or any suitable connection member capable of interconnecting the arms 54 with the wheel chocks 12. The adjustment member 52 may be any desired material, such as steel piping. In addition, the handles 60 may be any size and configuration to enable a user to adjust and move the assembly 50 and may be located at any desired position on the arms 54. Moreover, the pivoting ends 62 of the arms 54 may be various configurations for facilitating pivoting therebetween. For instance, the pivoting ends 62 may be attached to one another using a bolt 58, rivet, pin, etc. and one arm 54 could be slotted to receive the other arm within the slot or interconnected using other similar techniques. Furthermore, although each retaining plate 66 is shown as being generally "egg-shaped," the retaining plate could be any size and configuration that is capable of being secured to respective wheel chocks 12 and securing the flexible member 18 thereto. For example, the retaining plates 66 could be rectangular or triangular in configuration and include holes 68 for receiving ends of the chain 26 therethrough.

Figure 8:
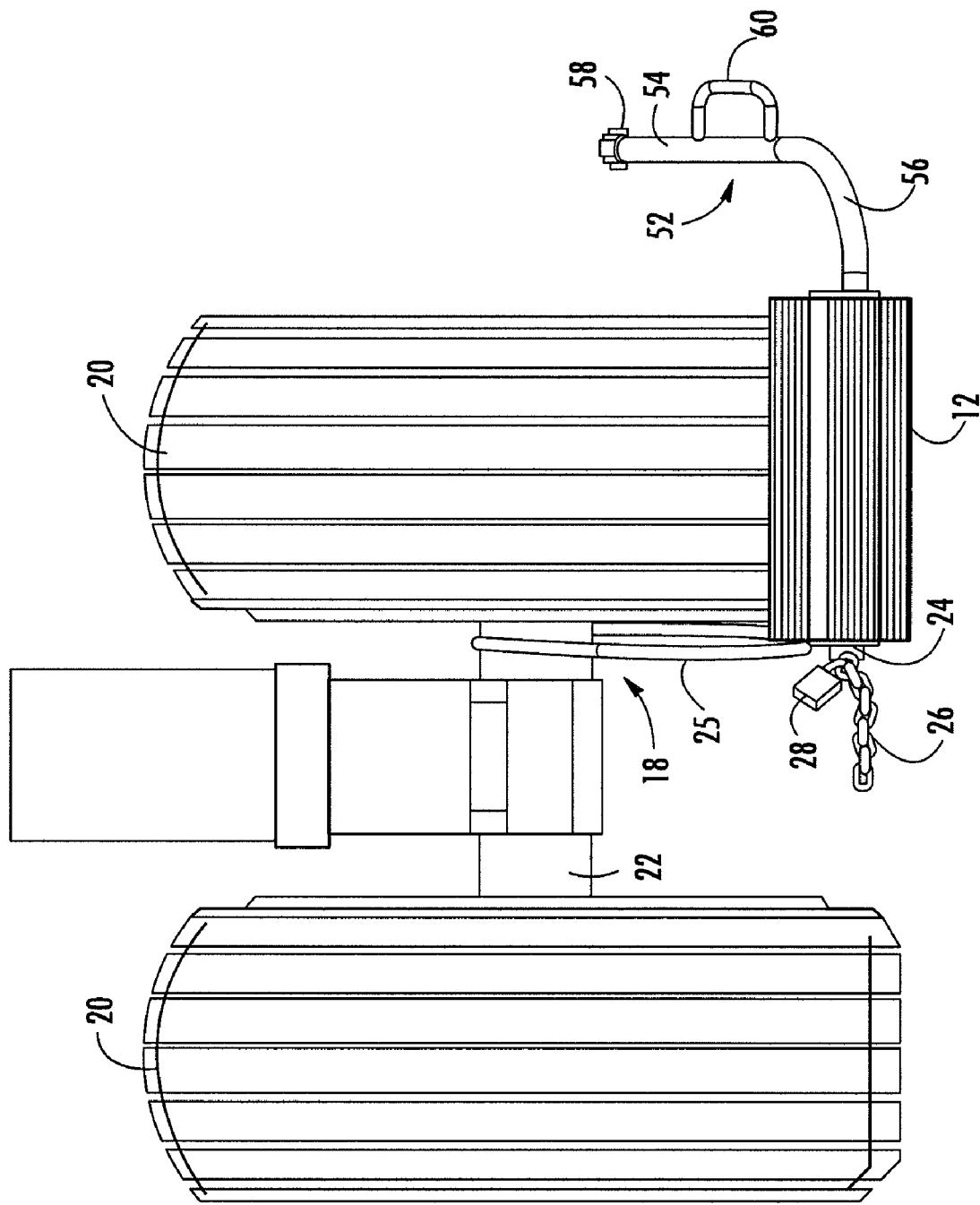
FIG. 8 is a front elevation view of the wheel chock apparatus shown in FIG. 5 secured to a wheel.
Figure 10A:
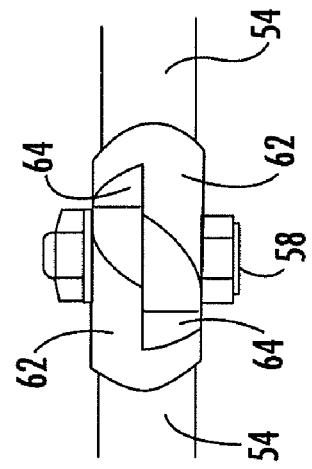
FIGS. 10A-10D are enlarged views of FIGS. 6-9 illustrating the pivoting ends of the adjustment member.
Figure 10B:
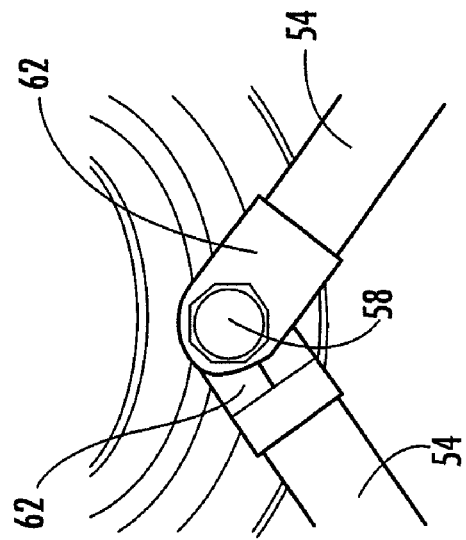
Figure 10C:
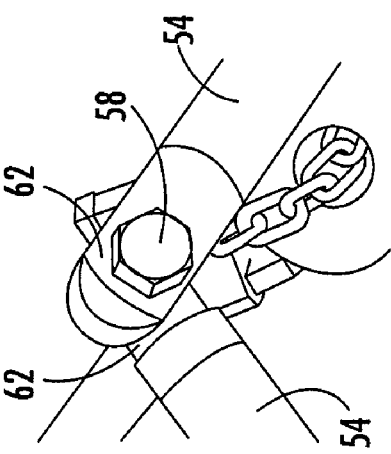
Figure 10D:
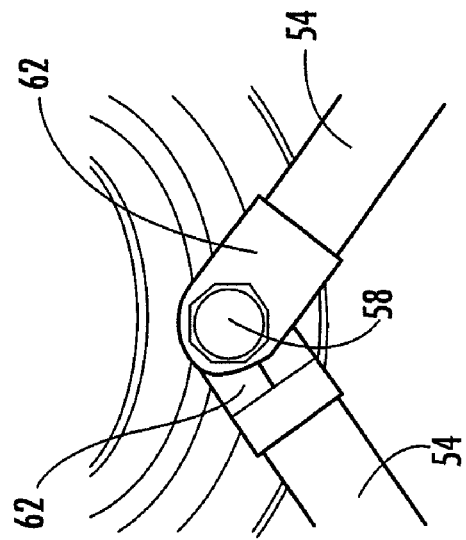

Positioning the wheel immobilizer apparatus 50 for immobilizing a wheel is similar to that described above with respect to the wheel immobilizer apparatus 10. In this regard, the wheel immobilizer apparatus 50 may be secured to a wheel 20, as shown in FIGS. 7-9. Once positioned on opposite sides of the wheel 20, the distance between the chocks 12 may be adjusted with the adjustment member 52 depending on the diameter of the wheel 20 by pivoting the arms 54 relative to one another. FIG. 9 shows a view of the apparatus 50 secured to a 727 nose wheel and a partial view of the apparatus secured to a 747 nose wheel, although the apparatus may be configured to be secured to any sized wheel. Once the chocks 12 are positioned adjacent to, and on opposite sides of, the wheel 20, one end of the flexible member 18 that is initially not secured to the chock is wrapped about the circumference of the axle 22 at least one revolution. The end of the flexible member 18, including the guide pin 70, is then positioned though the hole 68 of the retaining plate 66, tensioned to a desired tension, and then secured with a lock 28. Thus, once the flexible member 18 is tensioned and secured to respective retaining plates 66, the wheel 20 is immobilized such that rolling or turning of the wheel is substantially restricted. In addition, the wheel immobilizer apparatus 50 may not be removed from the wheel 20 without breaking the adjustment member 52 or flexible member 18 or without significant disassembly.

Embodiments of the present invention may provide several advantages. For example, the wheel immobilizer apparatus 10 may be employed to not only immobilize a wheel 20 of a vehicle, but also provide additional security from theft. Moreover, the apparatus 10 may be employed with conventional chocks 12 and may be readily assembled and disassembled. The apparatus 10 may also be user friendly, as aircraft personnel may readily position and secure the apparatus to the wheel 20.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for immobilizing a wheel of a vehicle comprising:
   positioning a pair of discrete chocks on opposite sides of a wheel and on a rolling surface, each chock having a first end and a second opposite end;
   adjusting a relative distance between the pair of chocks such that the chocks are positioned adjacent to the wheel so as to prevent the wheel from rolling, wherein the adjusting step comprises adjusting a relative distance between the pair of chocks with an adjustment member coupled proximate to each of the respective first ends of the pair of chocks;
   securing a single flexible member to an axle of the wheel by wrapping the single flexible member at least one revolution about the axle; and
   securing the single flexible member to the pair of chocks, wherein the flexible member has a pair of free ends and each free end is attached to a respective one of the pair of chocks so as to immobilize the wheel, wherein the step of securing the flexible member to the pair of chocks comprises attaching the flexible member to the chocks such that each free end is attached proximate to respective second ends of each of the chocks.

2. The method of claim 1, further comprising tensioning the flexible member prior to securing the flexible member to the pair of chocks.

3. The method of claim 1, wherein the step of securing the flexible member to the pair of chocks comprises wrapping a medial portion of the flexible member located between the free ends at least one revolution about the axle.

4. The method of claim 1, wherein the step of securing the flexible member to the pair of chocks comprises wrapping the flexible member at least one revolution about an axle having a longitudinal axis extending through the axis of rotation of the wheel.

5. The method of claim 1, wherein the adjusting step comprises linearly displacing the chocks along the rolling surface.

6. The method of claim 1, wherein the positioning step comprises positioning the pair of chocks on radially opposite sides of the wheel.

7. A wheel immobilizer apparatus for immobilizing a wheel of a vehicle comprising:
   a plurality of discrete chocks each configured to be positioned adjacent to a wheel and on a rolling surface so as to prevent the wheel from rolling, each chock comprising a first end and a second opposite end;
   an adjustment member coupled proximate to each of the first ends of a pair of chocks and configured to adjust a relative distance between the pair of chocks; and
   a single flexible member configured to attach proximate to the second ends of each of the chocks, wherein the flexible member has a pair of free ends and each free end is configured to attach to a respective one of the pair of chocks, and wherein the single flexible member is configured to wrap about a wheel axle at least one revolution so as to immobilize the wheel.

8. The apparatus of claim 7, wherein the flexible member comprises a chain disposed within a hose member.

9. The apparatus of claim 7, wherein the adjustment member comprises a rod member slidably disposed within a pipe member.

10. The apparatus of claim 9, wherein each of the rod member and pipe member is coupled to a respective chock with a connection member.

11. The apparatus of claim 7, wherein a hole is defined in a pair of surfaces of each of the plurality of chocks and is configured to receive the flexible member therethrough.

12. The apparatus of claim 7, wherein at least one of the free ends is removably attached to one of the pair of chocks in order to lock and unlock the apparatus to the wheel.

13. The apparatus of claim 7, wherein the flexible member is configured to wrap about a wheel axle having a longitudinal axis extending through the axis of rotation of the wheel.

14. The apparatus of claim 7, wherein the adjustment member is configured to facilitate linear displacement of the chocks along the rolling surface.

15. The apparatus of claim 7, wherein the pair of chocks are configured to be positioned on radially opposite sides of the wheel.

16. The apparatus of claim 7, wherein each of the chocks are identical in size and shape.

\* \* \* \* \*